(12) United States Patent
Slyfield (10) Patent No.: US 9,122,883 B2
(45) Date of Patent: Sep. 1, 2015

(54) SECURITY SYSTEM AND METHOD FOR CONTROLLING INTERACTIONS BETWEEN COMPONENTS OF A COMPUTER SYSTEM

(71) Applicant: GE Aviation Systems Limited, Cheltenham, Gloucestershire (GB)

(72) Inventor: Christopher James Slyfield, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 145 days.

(21) Appl. No.: 13/865,518

(22) Filed: Apr. 18, 2013

(65) Prior Publication Data

US 2013/0291057 A1    Oct. 31, 2013

(30) Foreign Application Priority Data

Apr. 27, 2012    (GB) .................................. 1207404.3

(51) Int. Cl.
*G06F 21/50*      (2013.01)
*G06F 21/57*      (2013.01)
*G06F 21/60*      (2013.01)

(52) U.S. Cl.
CPC .............. *G06F 21/604* (2013.01); *G06F 21/50* (2013.01); *G06F 21/577* (2013.01)

(58) Field of Classification Search
CPC ....................................................... G06F 21/50
See application file for complete search history.

(56) References Cited

U.S. PATENT DOCUMENTS

| 4,184,201 | A |  | 1/1980 | Melberg et al. |
| 5,790,862 | A | * | 8/1998 | Tanaka et al. .................. 717/159 |
| 2003/0208690 | A1 |  | 11/2003 | Aull |
| 2007/0226494 | A1 |  | 9/2007 | O'Brien et al. |
| 2009/0212928 | A1 | * | 8/2009 | Aijaz .......................... 340/426.1 |
| 2011/0302413 | A1 |  | 12/2011 | Arroyo et al. |

OTHER PUBLICATIONS

GB Search and Examination Report dated Oct. 23, 2013, issued in connection with corresponding GB Patent Application No. GB1307621.1.

* cited by examiner

*Primary Examiner* — Gilberto Barron, Jr.
*Assistant Examiner* — Simon Kanaan
(74) *Attorney, Agent, or Firm* — General Electric Company; William S. Munnerlyn (57) ABSTRACT

The embodiments of the present invention relate to controlling interactions between one or more components of a computer system, where each component is assigned a fixed security level and all currently active and newly requested interactions between components of the system are monitored.

8 Claims, 7 Drawing Sheets

$$((c_2^{t_1 l+1} \Leftarrow c_2^{t_2 l+1}) > 1) \rightarrow \Psi(t_{l+1} = \text{false}) \tau$$

$$\left\{ \begin{array}{l} \text{for } t_{l+1} \left\{ \begin{array}{l} c_2^k > c_2^n, c_1^k = Q^{max}(c_3^k) \text{ AND } c_1^n = Q^{min}(c_3^n) \\ c_2^k < c_2^n, c_1^k = Q^{min}(c_3^k) \text{ AND } c_1^n = Q^{max}(c_3^n) \\ c_2^k = c_2^n, c_1^k = Q^{min}(c_3^k) \text{ AND } c_1^n = Q^{min}(c_3^n) \end{array} \right. \\[1em] (c_1^{t_1 l+1} \Leftarrow c_1^{t_2 l+1}) > 1, \Lambda(c_3^{t_1 l+1}, c_3^{t_2 l+1}) \left\{ \begin{array}{l} c_1^{t_1 l+1} > c_1^{t_2 l+1} \left\{ \begin{array}{l} t_l \in c_3^{t_1 l+1}, \max(c_2^{t_1 l}, c_2^{t_2 l}) > c_2^{t_1 l+1} \left\{ \begin{array}{l} 0, t_l = \text{true} \\ 1, t_3 > t_3^{l+1} \left\{ \begin{array}{l} 0, t_l = \text{true} \\ 1, t_l = \text{false} \end{array} \right. \end{array} \right. \\ t_l \in c_3^{t_2 l+1}, \min(c_2^{t_1 l}, c_2^{t_2 l}) < c_2^{t_2 l+1} \left\{ \begin{array}{l} 0, t_l = \text{true} \\ 1, t_3 > t_3^{l+1} \left\{ \begin{array}{l} 0, t_l = \text{true} \\ 1, t_l = \text{false} \end{array} \right. \end{array} \right. \end{array} \right. \\[2em] c_1^{t_1 l+1} < c_1^{t_2 l+1} \left\{ \begin{array}{l} t_l \in c_3^{t_1 l+1}, \min(c_2^{t_1 l}, c_2^{t_2 l}) < c_2^{t_1 l+1} \left\{ \begin{array}{l} 0, t_l = \text{true} \\ 1, t_3 > t_3^{l+1} \left\{ \begin{array}{l} 0, t_l = \text{true} \\ 1, t_l = \text{false} \end{array} \right. \end{array} \right. \\ t_l \in c_3^{t_2 l+1}, \max(c_2^{t_1 l}, c_2^{t_2 l}) > c_2^{t_2 l+1} \left\{ \begin{array}{l} 0, t_l = \text{true} \\ 1, t_3 > t_3^{l+1} \left\{ \begin{array}{l} 0, t_l = \text{true} \\ 1, t_l = \text{false} \end{array} \right. \end{array} \right. \end{array} \right. \end{array} \right. \\[2em] (c_1^{t_1 l+1} \Leftarrow c_1^{t_2 l+1}) > 1 \left\{ \begin{array}{l} 0, t_{l+1} = \text{true} \\ 1, t_{l+1} = \text{false} \end{array} \right. \\[1em] \text{for } t_{l+1} \left\{ \begin{array}{l} c_2^k > c_2^n, c_1^k = Q^{max}(c_3^k) \text{ AND } c_1^n = Q^{min}(c_3^n) \\ c_2^k < c_2^n, c_1^k = Q^{min}(c_3^k) \text{ AND } c_1^n = Q^{max}(c_3^n) \\ c_2^k = c_2^n, c_1^k = Q^{min}(c_3^k) \text{ AND } c_1^n = Q^{min}(c_3^n) \end{array} \right. \end{array} \right.$$

FIG. 7

SECURITY SYSTEM AND METHOD FOR CONTROLLING INTERACTIONS BETWEEN COMPONENTS OF A COMPUTER SYSTEM

BACKGROUND TO THE INVENTION

Embodiments of the present invention relate to computer systems and, in particular, to access control within a computer system.

With the continual proliferation of information technologies, an ever-increasing volume of data is in digital form and securing such data is a major challenge faced by most enterprises today, requiring protection of data at every access point by deploying more secure, yet at the same time, more accessible systems. Commercial companies host their web sites on servers that are networked with other of the organization's computer assets. Many commercial and non-commercial (e.g., government, military, health and educational) organizations communicate across networks and access the web from workstations that are also networked with systems storing and processing sensitive data. The widespread adoption of mobile devices and associated applications has added a further dimension, with such devices being increasingly used for banking and consumer transactions. The subversion of a single client or server provides an attacker with immediate connectivity to the information and computing resources of an entire organization, thereby compromising confidential information and potentially creating havoc in the operations of the organization. The number of data attacks has more than tripled in the past five years, making the need to balance security with increasing access demands, an even greater priority.

The typical elements in developing a security model are confidentiality, integrity, accessibility and data assurance. Data confidentiality is ensured by restricting disclosure to authorized access only, while data integrity guarantees that the data is protected from modification, whether deliberate or accidental. Data accessibility implies ease of access to data, while data assurance implies that a specific implementation provides a degree of confidence about pre-established security goals with, for example, confidentiality being paramount in defense applications and both confidentiality and data integrity being equally relevant in healthcare and financial applications.

Multi-level security models use a classification approach according to the sensitivity of data. Data with different security classifications can all reside in a single domain and be received, processed, stored and disseminated even though, not all users within the domain have the security clearance to access all the data within the domain. The best known multi-level security models are Bell-LaPadula and Biba in which a system comprises subjects and objects, with read operations involving data flowing from a object to a subject and write operations involving data flow from a subject to an object.

The Bell-LaPadula model deals with data confidentiality only, with each subject and object having a security level consisting of a classification or a clearance (i.e. SECRET, CLASSIFIED etc) which denotes the data's level of protection. The Bell-LaPadula model enforces two properties: (i) the simple security property: a subject at a given level of security must not read an object at a higher security level (no read up); and (ii) the *-property: a subject at a given level of security must not write to an object at a lower security level (no write down).

The Biba model deals with integrity alone, ignoring confidentiality entirely and also enforces two properties which are reverse to those of Bell-LaPadula: (i) the simple integrity property: a subject at a given level of integrity must not read an object at a lower integrity level (no read down); and (ii) the * integrity property: a subject at a given level of integrity must not write to any object at a higher level of integrity (no write up).

Although both the Bell-LaPadula and Biba security models have attempted to deal with dataflow across multi levels of security, they are both notoriously restrictive and inflexible. Both models effectively allow dataflow in one direction only, Bell-LaPadula permitting read-down and write-up (relative to security level) only, thereby ensuring data confidentiality and Biba permitting read-up and write-down only, thereby ensuring data integrity. However, neither model ensures both data integrity and confidentiality. If implemented strictly, both models have inherent problems as it is not possible practically, to implement a system where data only goes in one direction.

"Workarounds" have evolved in attempts to implement both models in practical situations, such as allowing limited bandwidth flow in forbidden direction. However, this is, in effect, a form of declassification will always compromise security of a system to at least some extent. In addition, such declassification usually involves increasing the security or integrity level of a subject or object in order to minimise risk, which eventually leads to most subjects/objects having the top level of security or integrity which effectively results in a system that has no security or integrity level partitioning. In order to ensure security of the most sensitive components and data of a system, Chinese Wall approaches have been used, involving building huge defensive mechanisms around these components, but again, this results in inflexibility of the system and is not an economical use of resources.

SUMMARY OF THE INVENTION

Embodiments of the present invention reside in a method of controlling interactions between one or more components of a computer system, the system compromising a plurality of components configured to interact with each other to engage in activities. The method comprises assigning a fixed security level to each component of the system and monitoring all currently active and newly requested interactions between components of the system, where a newly requested interaction comprising a request by a source component to interact with a destination component. In an embodiment of the present invention, the assigned security levels of the components are assessed and if the difference between the security levels of the source and destination components exceeds one level, the requested interaction is prohibited; if a difference of one level between the security levels of the components exists, the interactions of both components are assessed; if a component is engaged in an interaction with any component with a lower assigned security level than its own and the requested interaction involves a source or destination component with a higher assigned security level, or is currently engaged in an interaction with any component with a higher assigned security level, the requested interaction is prohibited; if a component is engaged in an interaction with any component with a higher assigned security level than its own, and the requested interaction involves a source or destination component with a lower assigned security level, or is currently engaged in an interaction with any component with a lower assigned security level, the requested interaction is prohibited; if a component contains data having a higher security level than that assigned to the component, and the requested interaction involves a source or destination component with a lower assigned security level, or that is currently engaged in an interaction with any component with a lower assigned security level, the requested interaction is prohibited; if a component contains data having a lower security level than that assigned to the component, and the requested interaction involves a source or destination component with a higher assigned security level, or that is currently engaged in an interaction with any component with a higher assigned security level, the requested interaction is prohibited; otherwise, the requested interaction is allowed.

In monitoring all currently active and newly requested interactions between components of the system, a status value is determined for each of the source component and destination component of a requested interaction, the status value being dependent on the assigned security levels of components currently engaged in interactions with the source and destination component of the requested interaction.

The status values of the source and destination components of the requested interaction are compared and a status block condition is imposed, when a difference of more than a single security level exists between the status values of the source and destination components. The requested interaction is prohibited while a status block condition exists.

A priority level is assigned to each activity that a component may engage in during an interaction. When a status block condition has been imposed, the existing interactions of the source and destination components that have given rise to the status block condition are isolated and the priority levels associated with the activity involved in the isolated interactions are compared with the priority level associated with the activity involved in the requested interaction between the source and destination components. The status block condition is lifted when the priority level of the activity of the isolated interaction is lower than that of activity of the requested interaction between the source and destination components and the requested interaction allowed. Otherwise the status block condition is maintained and the requested interaction between the source and destination components remains prohibited.

Embodiments of the present invention further reside in a computer program comprising computer program code configured to perform one or more of the steps of the above-described method of controlling interactions between one or more components of a computer system when run on a computer.

Embodiments of the present invention further reside in a non-transitory, computer-readable medium storing program code instructions executable by a computer processor to perform one or more of the steps of the above-described method of controlling interactions between one or more components of a computer system.

Embodiments of the present invention further reside in a security system of controlling interactions between one or more components of a computer system, the computer system comprising a plurality of components configured to interact with each other to engage in activities. The security system comprises a security model enforcement mechanism (SMEM) configured to assign a fixed security level to each component of the system; and monitor all currently active and newly requested interactions between components of the system, a newly requested interaction comprising a request by a source component to interact with a destination component. If the difference between the security levels of the source and destination components exceeds one level, the SMEM is configured to prohibit the requested interaction; if a component is engaged in an interaction with any component with a lower assigned security level than its own and the requested interaction involves a source or destination component with a higher assigned security level, or that is currently engaged in an interaction with any component with a higher assigned security level, the SMEM is configured to prohibit the requested interaction; if a component is engaged in an interaction with any component with a higher assigned security level than its own, and the requested interaction involves a source or destination component with a lower assigned security level, or that is currently engaged in an interaction with any component with a lower assigned security level, the SMEM is configured to prohibit the requested interaction; if a component contains data having a higher security level than that assigned to the component, and the requested interaction involves a source or destination component with a lower assigned security level, or that is currently engaged in an interaction with any component with a lower assigned security level, the SMEM is configured to prohibit the requested interaction; if a component contains data having a lower security level than that assigned to the component, and the requested interaction involves a source or destination component with a higher assigned security level, or that is currently engaged in an interaction with any component with a higher assigned security level, the SMEM is configured to prohibit the requested interaction; otherwise, the mechanism is configured to allow the requested interaction.

Embodiments of the present invention further reside in a security system of controlling interactions between one or more components of a computer system, the computer system including a plurality of components configured to interact with each other to engage in activities. The security system comprises a security model enforcement mechanism (SMEM) comprising executable instructions that when executed by a computer processor perform one or more of the steps of the above-described method of controlling interactions between one or more components of a computer system. In some such embodiments the executable instructions are embodied on a non-transitory computer-readable medium.

BRIEF DESCRIPTION OF DRAWINGS

Embodiments of the present invention will now be described, by way of reference only, to the accompanying drawings in which:

FIG. 7 illustrates Equation 7 of the description.

DETAILED DESCRIPTION

As used in this application, the term "component," refers to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Although embodiments of the present invention will be described in terms of software components, it should be understood that the embodiments of the present invention are not limited in this regard.

Figure 1:
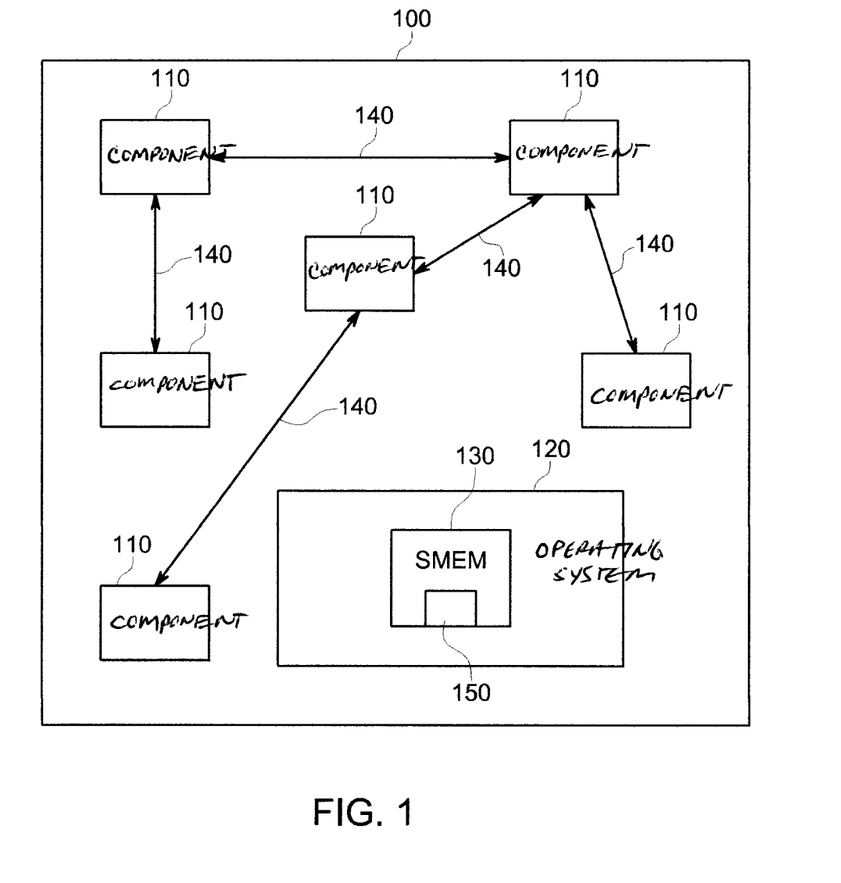
FIG. 1 illustrates a system block diagram of a computer system in which an embodiment of the present invention may be implemented.

Referring to FIG. 1, there is shown a computer system 100, including a plurality of components 110 running under the control of an operating system 120 which includes a security model enforcement mechanism SMEM (130). The security model enforcement mechanism SMEM (130) controls all interactions 140 between all components 110 of the computer system 100 and runs on a kernel level of the computer operating system 120 having the same rights as the operating system 120, so that all interactions can be monitored and controlled. An interaction 140 is a request from one component 110 to another to interact so as to execute one or more processes or access data, and may include data being transmitted between components 110 during the interaction. The security model enforcement mechanism SMEM 130 is arranged to implement a security model 150 that evaluates all requested interactions between the components 110 of the system and allows or denies the requested interaction between components 110 on the basis of the evaluation. The security model enforcement mechanism SMEM 130 is implemented in a secure environment that cannot be accessed or circumvented by any components 110 of the system 100.

It should be understood that the security model 150 can be enforced in many ways depending on the architecture employed. For example, the SMEM 130 may be an independent secure application having the right to monitor and control all interactions.

Each component 110 of the system 100 is assigned a security level q1 . . . qn, based on the relative importance or sensitivity of its functionality of and/or stored data, where q1 denotes the highest level of security and qn the lowest level of security. The operating system 120 of an embodiment of the present invention operates a multitasking environment, where each component 110 may interact with one or more other components 110 of the system 100 to execute one or more activities or processes 160 concurrently. For the purposes of describing an embodiment of the present invention, a source component 112 is the component requesting an interaction 140 and a destination component 114 is the component with which interaction is desired. According to the security model 150 of an embodiment of the present invention, the evaluation made by SMEM 130 as to whether an interaction between two components 110 is allowable, is made not only on the basis of the assigned security levels q1 . . . qn of the components but also in dependence on the current activities 160 being executed by each of the two components 110.

A simplified summary of the rules of the security model 150 of embodiments of the present invention as is enforced by SMEM 130 is as follows.

If a component 110 is engaged in an interaction 140 with a component 110 of lower security level, then it may not initiate a new interaction 140 with, or accept a new interaction request from a component 110 that is of, or is currently engaged in, an interaction with a component of higher security level than itself.

If a component 110 is engaged in an interaction 140 with a component 110 of higher security level, then it may not initiate an interaction 140 with, or accept an interaction 140 request from a component 110 that is of, or is currently engaged in an interaction 140 with a component 110 of a lower security level than itself.

If a component 110 contains data of higher security level than itself, then it may not initiate an interaction 140 with, or accept an interaction request from a component 110 that is of, or is currently engaged in, an interaction 140 with a component 110 of a lower security level than itself.

If a component 110 contains data of lower security level than itself, then it may not initiate an interaction 140 with, or accept an interaction request from a component 110 that is of, or is currently engaged in, an interaction 140 with a component 110 of a higher security level than itself.

Figure 2:
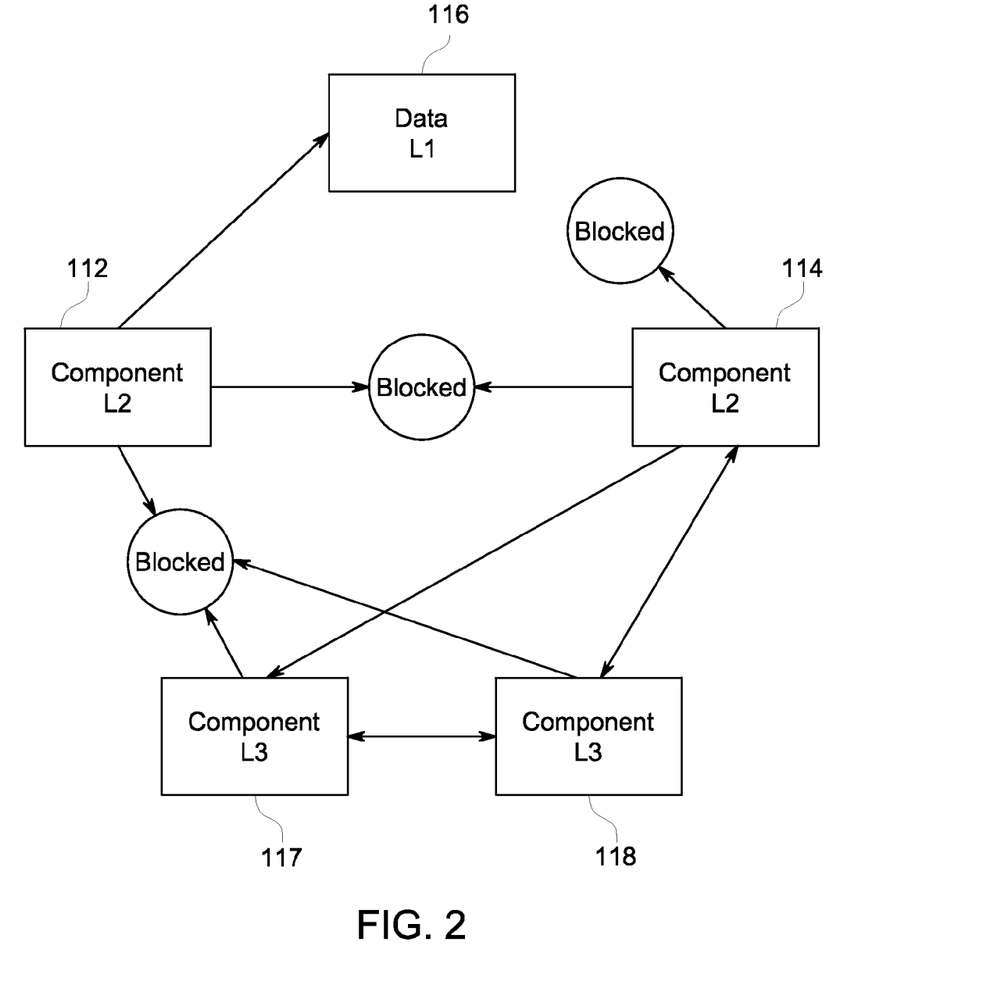
FIGS. 2 to 4 illustrate simple practical implementation examples of the security model as implemented by the present invention.
Figure 3:
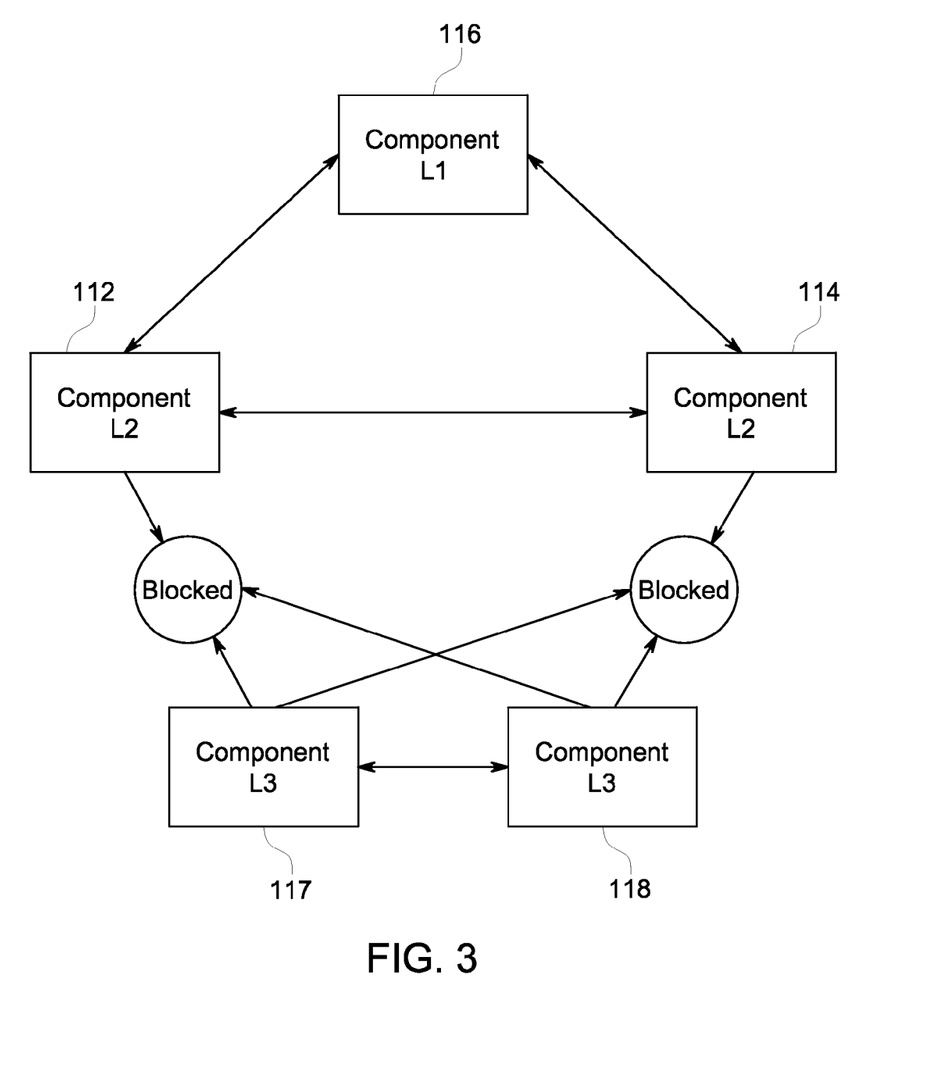
Figure 4:
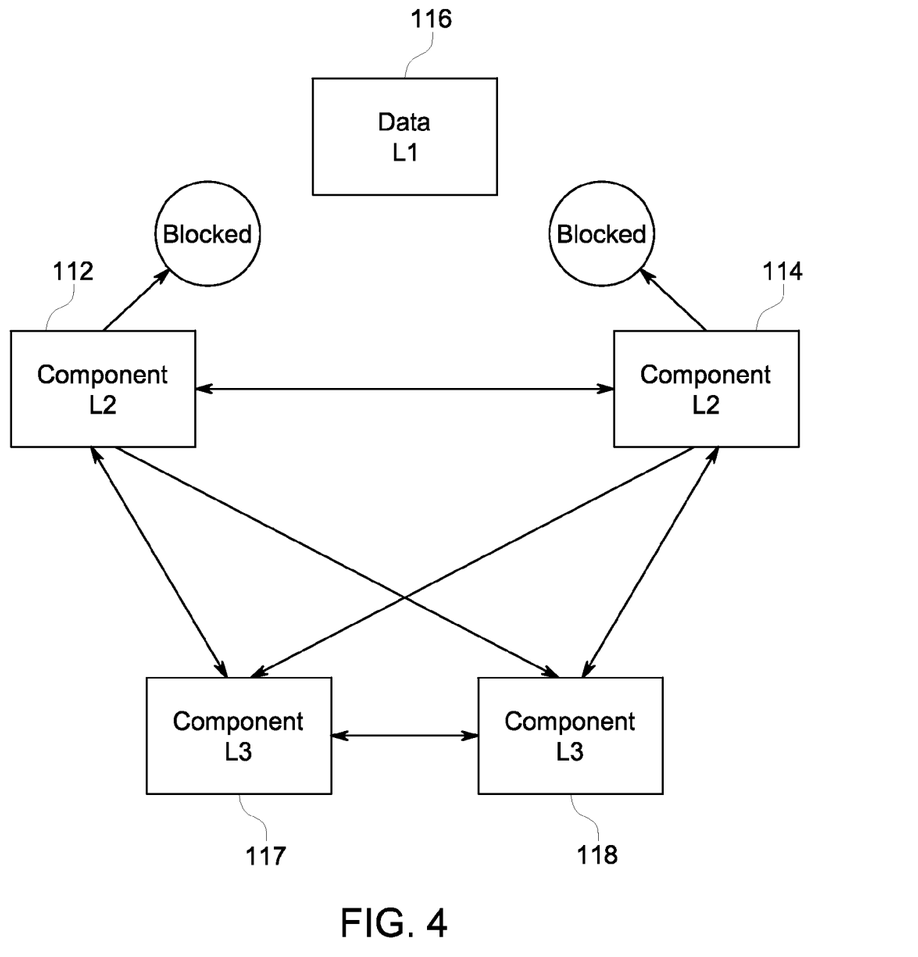

FIGS. 2 to 4 illustrate three different examples of the practical implementation of the rules of the security model 150 of an embodiment of the present invention. A security level q ranging from Level 1 to Level 4 (L1-L4) is assigned to each component 110, with Level 1 denoting the most secure and Level 4, the least secure. Referring to FIG. 2, component 112 having a security level of Level 2, is accessing data from component 116 which is assigned a security level of Level 1 due to the sensitive data stored therein, while component 114 which also has security level of Level 2 is interacting with components 117 and 118, both of which have been assigned security level of Level 3. In this situation, interaction between components 112 and 114 is prohibited because component 112 is interacting with the component 116 which has a higher security level and component 114 is currently involved in interactions with components 117 and 118 of lower security levels. Interaction between component 114 and component 116 is prohibited, as a consequence of component 114 currently being engaged in interactions with components 117 and 118 of lower security level. Components 117 and 118 may interact with each other independently of their interaction with component 114 of higher security level as they have the same security level, but communication with any component 110 of a lower security level will be prohibited. Communication between components 117 and 118 and component 112 is prohibited as a consequence of component 112 currently accessing data in component 116.

Referring to FIG. 3, both components 112 and 114 are accessing sensitive data in component 116. Interactions between components 112 and 114 for the purposes sharing data is allowed, despite both components being involved in interactions with component 116 as components 112 and 114 have the same security level. However, interactions transactions involving either of components 112 and 114 with either of components 117 or 118 will be prohibited, as a consequence of components 112 and 114 currently accessing data in component 116. Interactions between components 117 and 118 are allowed as they have the same security level and neither is involved in any interaction with components 100 of a higher or lower security level.

In the scenario shown in FIG. 4, component 112 is involved in an interaction with component 117, while component 114 is involved in a transaction with component 118. Applying the rules of the model 150 of the present invention, both components 112 and 114 are prohibited from accessing data in component 116, as a consequence of being involved in an interaction with components 117 and 118 of a lower security level but may request an interaction with or accept an interaction request from each other. Component 112 may also initiate communication with or accept a request from component 118, while component 114 may request an interaction with or accept a request for interaction from component 117. Components 117 and 118 may also communicate with each other as they have the same security level, but will be prohibited from any communication with components 110 of a lower security level.

The security model 150 of an embodiment of the present invention as enforced by SMEM 130 will now be described in more detail. Expressed formally, the security model 150 is based upon the following sets:

(i) System component c: c∈C(c$_1$ ... c$_n$) identifying each component of the system;

(ii) Security Status S, which is a dynamic value, dependent on the particular activities being executed by a component at a particular time; and (iii) Security level q: q=Q(q$_1$ ... q$_n$) which is a fixed value assigned to each component on the basis of the relative importance or sensitivity of its functionality or any the data stored therein, where q$_1$ denotes the highest security rating and q$_n$ the lowest security rating.

It should be understood that the higher the value of q, the lower the security level assigned thereto (i.e., a component assigned a value of q$_1$ has a higher security level than a component assigned a value of q$_3$). For example, in an aircraft system, components relating to the controls of the aircraft may be assigned the highest security level q$_1$ for safety reasons, while a sensor network within the aircraft system that monitors and provides data relating to movement of the working parts of the aircraft, may have sensor nodes that are each assigned a lower security level of q$_3$, as these components are less critical than the controls of the aircraft. A functional link exists between the sensors and the controls but these are separated by a decision making functional entity that is assigned a security level of q2. It should be understood that although the security level q of a component is fixed at run-time of the system, assigned security levels can be reconfigured as necessary as system requirements change.

The security model 150 is based upon the following additional sets:

(iv) Priority level p: p=P (p$_1$ ... p$_n$) which is a fixed value assigned to each activity of a component, where p$_1$ denotes the highest priority rating and p$_n$ denotes the lowest priority rating. As with the security level q, it should be understood that the higher the value of p, the lower the priority assigned thereto (i.e., an activity assigned a value of p$_1$ will have priority over an activity assigned a value of p$_3$). For example, in an aircraft system, a routine functionality, such as driving an actuator, that is assigned a priority level p$_3$ could be pre-empted by a special condition such as an alert threshold detected by a sensor, having a higher priority level of p$_2$; and (v) Active associations of a component t∈T(t$_1$ ... t$_l$)$^c$ where t$_l$⊆c$_k$×c$_n$ denotes a current interaction between two components c$_k$ and c$_n$; and t$_{l+1}$ denotes a newly requested interaction to be evaluated by the SMEM 130.

Each component c$_k$ 110 of the system is defined in terms of its security status S$_{c_k}$, a fixed security level q$_{c_k}$ assigned to that component and the current set of active associations of the component T$^{c_k}$:

$$c_k = S_{c_k} \times q_{c_k} \times T^{c_k} \text{ is expressed as } c_k = (c_1^k, c_2^k, c_3^k) \quad \text{Equation 1}$$

Each activity t is defined in terms of the two components 110 involved in the activity (i.e., a source component k 112 that requested the interaction and a destination component n 114 with which the interaction is requested), and the fixed priority level p$_l$ assigned to the activity t:

$$t_l = c_k \times c_k \times p_{t_l} \text{ is expressed as } t_l = (t_1^l, t_2^l, t_3^l) \quad \text{Equation 2}$$

An existing activity is represented as t$_l$, denoting a current activity involving component k (t$_1^l$) and component n (t$_2^l$), where component k is the source component that initiated the interaction with destination component n. A new activity is represented as (t$_{l+1}$), denoting a newly requested activity involving interaction between component k (t$_1^{l+1}$) and component n (t$_2^{l+1}$), initiated by component k and which is to be evaluated by the SMEM 130 before the interaction is allowed.

Figure 5:
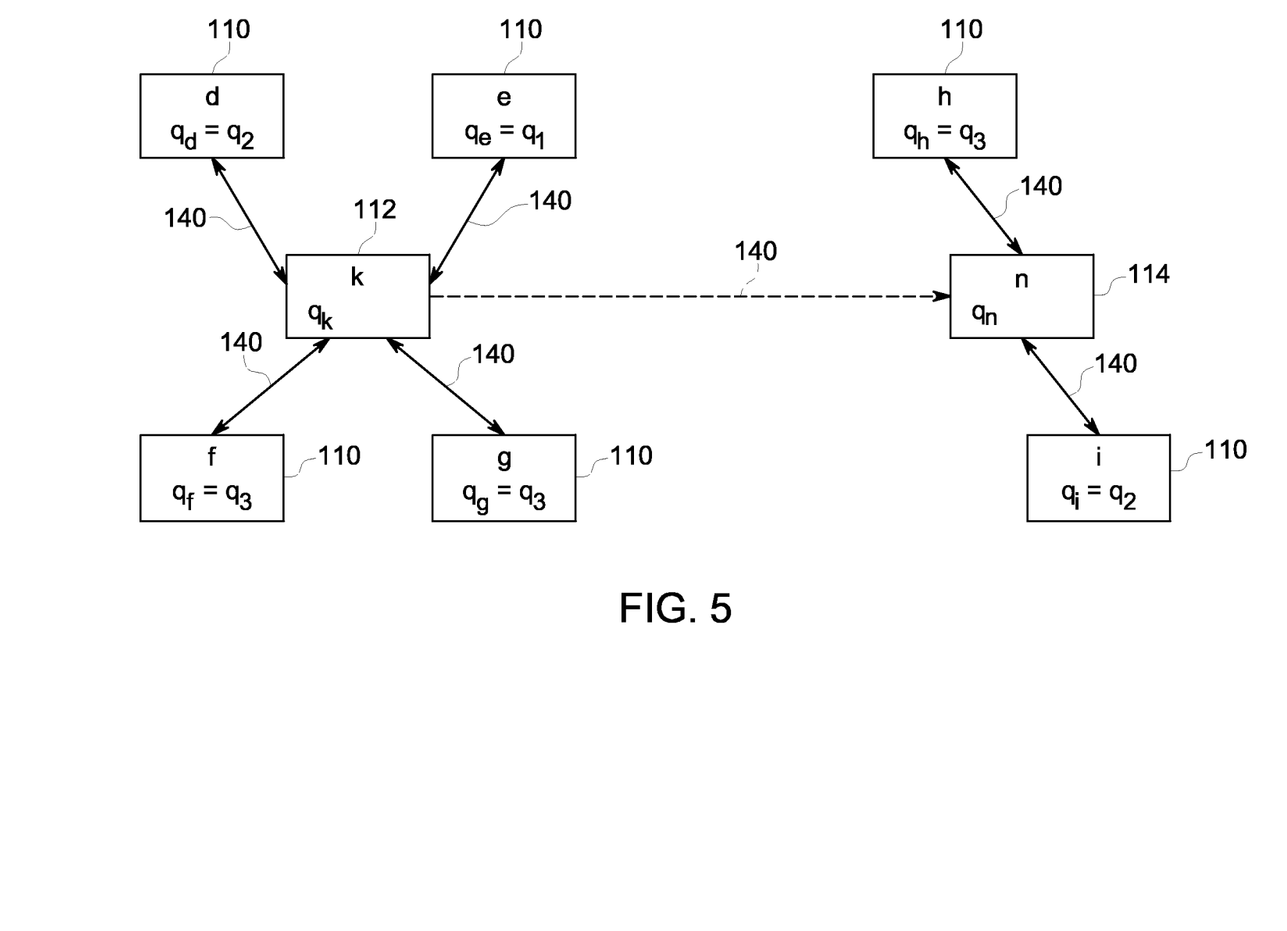
FIG. 5 is a block diagram illustrating the existing interactions of two components of a newly requested transaction.

The status value S is a dynamic value that is determined by the SMEM 130 for the source 112 and destination 114 components of each new interaction request and reflects the current activity of each component. The determined status value must take account of differences in security levels between all components 110 with which the source 112 or destination 114 component are current actively associated (i.e., involved in an interaction with). For example, as illustrated in FIG. 5, a component k is currently interacting with components d, e, f and g, where component d has been assigned a security level of q$_2$, component e a security level of q$_1$, and components f and g a security level of q$_3$ (i.e. component e is the most secure of all interacting components and components f and g are the least secure, q$_f$>q$_e$) Meanwhile, component n is currently interacting with components h and i, where component i has been assigned a security level q$_2$ and component h a security level of q$_3$ (i.e., component i is more secure than component h). A further interaction involving component k with component n is now requested by source component k.

First, the legality of the request must be determined with regard the security levels of components k and n. If the components are separated by more than one security level, then communication is prohibited and any further assessment is unnecessary.

$$\varphi\left(\left(c_2^{l^{l+1}} \simeq c_2^{l_2^{l+1}}\right) > 1\right) \to \psi(t_{l+1} = \text{false}) \quad \text{Equation 3}$$

The determination of the status values for components k and n as illustrated in FIG. 5, by SMEM 130 applying the security model 150 of an embodiment of the present invention will now be described with reference to the flow diagram of FIG. 6. The process starts with step 200, and in step 202, the assigned security levels q$_k$ and q$_n$ of components k and n are read. In step 204, SMEM looks at all current active associations (i.e. the current interactions) of each of components k and n and reads the security levels of the components involved. In step 206, SMEM compares the security levels q$_k$ and q$_n$ of components k and n. In step 208, if it is determined that component k has a lower security rating (i.e., it is less secure) than that of component n (i.e., q$_k$>q$_n$), the status S$_{c_k}$ of component k must be assigned a value that corresponds to the security level of the least secure component 110 with which it is actively associated (i.e., Q$^{max}$), while the status S$_{c_n}$ of component n must be assigned a value corresponding to the most secure component 110 with which it is currently associated (i.e., Q$^{min}$). Therefore, in step 210, component k will be allocated a status value S$_{c_k}$ corresponding to the security level of component f or g (S$_{c_k}$=q$_f$, g=q$_3$) and component n will be allocated a status value S$_{c_n}$ corresponding to the security level of component i (S$_{c_n}$=q$_i$=q$_2$).

If, however, in step 208, it is determined that component k does not have a lower security rating than that of component n (i.e., q$_k$>q$_h$), the process continues in step 212, where it is determined whether component k has a higher security rating (i.e., it is more secure) than component n (q$_k$<q$_h$). If so, the status S$_{c_k}$ of component k must be assigned a value corresponding to the security level of the most secure component 110 with which it is actively associated (i.e., Q$^{min}$), while the status S$_{c_k}$ of component n must be assigned a value corresponding to the security level of the least secure component 110 with which it is actively associated (i.e., Q$^{max}$). Therefore, in step 214, component k will be allocated a status value S$_{c_k}$ corresponding to the security level of component e (S$_{c_k}$=q$_e$=q$_1$) and component n will be allocated a status value S corresponding to the security level of component h (S$_{c_k}$=q$_h$=q$_3$).

However, if in step 212, it is determined that component k and n have been assigned the same security levels, then the status S is assigned a value corresponding to the security level of the most secure component 110 with which components k or n are currently actively associated (i.e., $Q^{min}$). Therefore, in step 216, component k will be allocated a status value $S_{c_k}$ corresponding to the security level of component e ($S_{c_k}=q_e=q_1$) and component n will be allocated a status value $S_{c_k}$ corresponding to the security level of component i ($S_{c_k}=q_1=q_2$).

By setting the status S of each of component k and n, to the value of corresponding to one of the lowest or highest security level of any component 110 with which they are currently actively associated, ensures that there is maximum security clearance between all active associations at any time. This eliminates the risk of prohibited interactions between components of different security levels.

Expressed formally, the security status of actively associated components is assigned as follows:

for $$c_k \rightarrow c_n \begin{cases} c_2^k > c_2^n, c_1^k = Q^{max}(c_3^k) AND c_1^n = Q^{min}(c_3^n) \\ c_2^k < c_2^n, c_1^k = Q^{min}(c_3^k) AND c_1^n = Q^{max}(c_3^n) \\ c_2^k = c_2^n, c_1^k = Q^{min}(c_3^k) AND c_1^n = Q^{min}(c_3^n) \end{cases}$$

After the status value $S_{c_k}$ and $S_{c_k}$ of each of the source component 112 and the destination component 114 has been determined by SMEM 130 as described with reference to FIGS. 5 and 6 above, a decision is made as to whether the requested interaction is to be allowed based on the difference in the status values of components k and n. If the difference between the determined status S values of components k and n is greater than 1, (i.e., there is more than a single security level between the highest/lowest level current associated activities of components k and n) a security status block occurs and interaction between the two components is prohibited. In other words, the security model 150 of the present invention allows interaction between components at only one security level above and one level below (i.e., it is one level discoverable). Therefore, a requested interaction between the two components will result in a status block condition if a difference between the security levels of any components with which the two are currently interacting exceeds a single security level.

Therefore referring again to FIG. 6, in step 210, where the status value of component k has been assigned as $S_{c_k}=q_{f,g}=q_3$ and that of component n as $S_{c_k}=q_i=q_2$ due to component k having a lower security rating than that of component n (i.e., $q_k > q_n$) in step 208, a difference of one security level exists between the status values of components k and n (i.e., between $q_3$ and $q_2$). Therefore, no security status block situation exists in step 218 and the requested new interaction between components k and n will be allowed.

Figure 6:
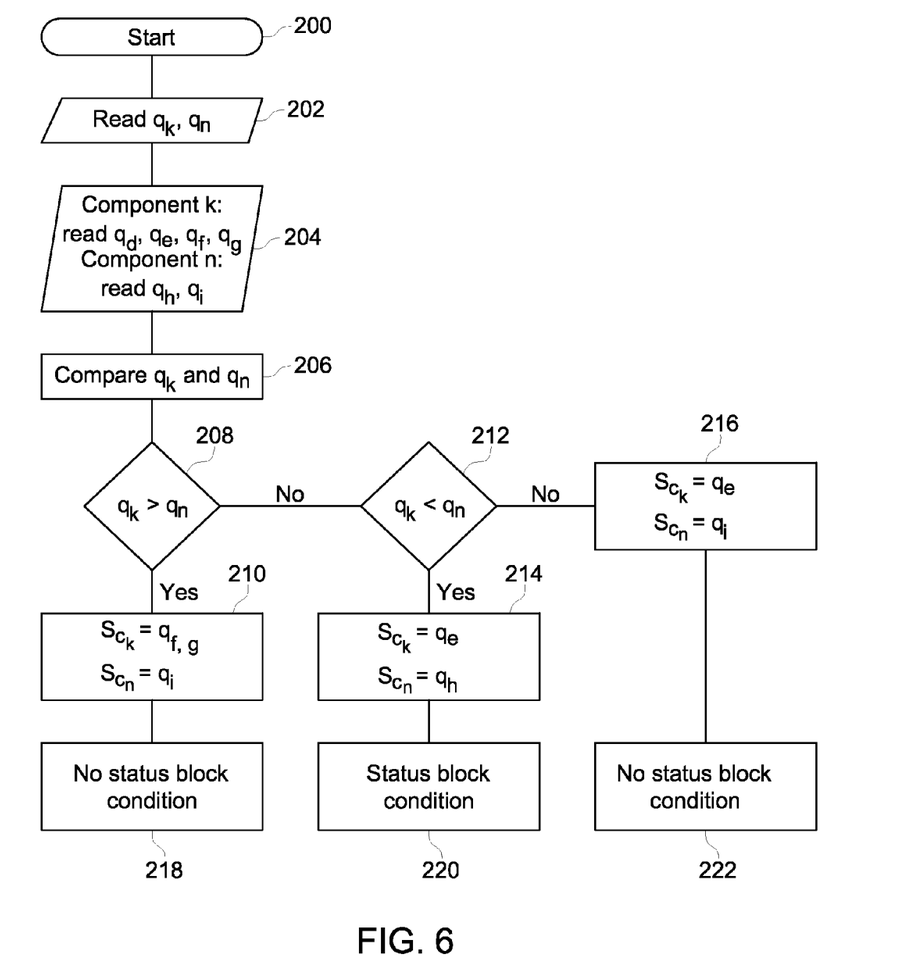
FIG. 6 is a flow diagram illustrating how the status of a component, and whether a status block exists, is determined.

However, if as in step 214 of FIG. 6, the status value of component k has been determined as $S_{c_k}=q_e=q_1$ and that of component n as $S_{c_k}=q_h=q_3$, due to component k having a higher security rating than that of component n (i.e., $q_k > q_n$) in step 212, a difference of two security levels exists between the status values of components k and n (i.e., between $q_1$ and $q_3$). Therefore a status block situation exists in step 220 and the requested new interaction between components k and n will be prohibited. For step 216 of FIG. 6, where the status value of component k has been determined as $S_{c_k}=q_e=q_1$ and that of component n as $S_{c_k}=q_i=q_2$ due to components k and n having the same security levels (i.e., neither steps 208 or 212 are true), a difference of a single security level exists between the status values of components k and n (i.e., between $q_1$ and $q_2$) is determined (i.e., between $q_1$ and $q_2$). Therefore in step 222, no status block situation exists and the new interaction is allowed.

This can be expressed formally as:

$$(c_1^k \doteq c_1^n) > 1 \begin{cases} 0, t_{l+1} = \text{true} \\ 1, t_{l+1} = \text{false} \end{cases} \quad \text{Equation 5}$$

In summary, a status block will occur under at least one of the following three conditions:

(i) the security level of source component 112 ($q_{c_k}$) is lower (i.e., less secure) than that of destination component 114 ($q_{c_n}$) and the difference between the security level of the least secure component 110 with which the source component 112 is currently actively associated ($(q(t_1^l))$) and the security level of the most secure component 110 with which the destination component 114 is actively associated ($q(t_2^l)$) is greater than 1;

(ii) the security level of source component 112 ($q_{c_k}$) is higher (i.e., more secure) than that of destination component 114 ($q_{c_n}$) and the difference between the security level of the most secure component 110 with which source component 112 is actively associated ($q(t_1^l)$) and the security level of the least secure component 100 with which destination component 114 is actively associated ($q(t_2^l)$) is greater than 1; or (ii) the security level of source component 112 ($q_{c_k}$) is equal to that of destination component 114 ($q_{c_n}$) and the difference between the security levels of the most secure components 100 with which each of the source component 112 ($q(t_1^l)$) and destination component 114 ($q(t_2^l)$) are currently actively associated is greater than 1.

However, even when a status block condition exists, the interaction between the source 112 and destination 114 components may still be authorised if a priority based pre-empt can occur. As described earlier, all activities are assigned a priority value and, in the instance of a status block condition, activities of lower priority may be pre-empted if the requested interaction involves an activity having a higher priority value. In order to determine if a priority pre-empt may occur, the interactions 160 that are giving rise to the status block are isolated.

For status block condition, if the existing interaction ($t_l$) of the source component 112 that is giving rise to the status block has lower priority than that of the newly requested interaction ($t_{l+1}$) between the components 112 and 114 requested by source component 112 (i.e., $t_3^l > t_3^{l+1}$), SMEM 130 determines that a priority pre-empt should occur causing the existing interaction ($t_1^l$) to be interrupted and the requested new activity ($t_{l+1}$) of higher priority involving interaction between the components 112 and 114 to begin. If however, the existing interaction ($t_l$) does not have a lower priority than that of the newly requested activity ($t_{l+1}$), (i.e., $t_3^l \leq t_3^{l+1}$), SMEM 130 determines that the existing interaction continues and newly requested interaction remains prohibited.

In summary, for all activities giving rise to a status block, if the priority of the existing activity is higher than or equal to the priority of a requested new activity, then the existing activity continues and the requested interaction remains prohibited. If however, the priority of the requested new activity is greater than that of the existing activity giving rise to the status block, then a priority pre-empt occurs causing the existing activity to be interrupted and the requested interaction between the two components to begin.

This is expressed formally in Equations 6 and 7.

$$\text{Equation 6}$$

$$\vee \left( c_3^{t_1^{l+1}}, c_3^{t_2^{l+1}} \right) \begin{cases} c_1^{t_1^{l+1}} > c_1^{t_2^{l+1}} \begin{cases} t_l \in c_3^{t_1^{l+1}}, \max\left(c_2^{t_1^l}, c_2^{t_2^l}\right) > c_2^{t_1^{l+1}} & \begin{cases} 0, & t_l = \text{true} \\ 1, & t_3^l > t_3^{l+1} \begin{cases} 0, & t_l = \text{true} \\ 1, & t_l = \text{false} \end{cases} \end{cases} \\ t_l \in c_3^{t_2^{l+1}}, \min\left(c_2^{t_1^l}, c_2^{t_2^l}\right) < c_2^{t_2^{l+1}} & \begin{cases} 0, & t_l = \text{true} \\ 1, & t_3^l > t_3^{l+1} \begin{cases} 0, & t_l = \text{true} \\ 1, & t_l = \text{false} \end{cases} \end{cases} \end{cases} \\ c_1^{t_1^{l+1}} < c_1^{t_2^{l+1}} \begin{cases} t_l \in c_3^{t_1^{l+1}}, \min\left(c_2^{t_1^l}, c_2^{t_2^l}\right) < c_2^{t_1^{l+1}} & \begin{cases} 0, & t_l = \text{true} \\ 1, & t_3^l > t_3^{l+1} \begin{cases} 0, & t_l = \text{true} \\ 1, & t_l = \text{false} \end{cases} \end{cases} \\ t_l \in c_3^{t_2^{l+1}}, \max\left(c_2^{t_1^l}, c_2^{t_2^l}\right) > c_2^{t_2^{l+1}} & \begin{cases} 0, & t_l = \text{true} \\ 1, & t_3^l > t_3^{l+1} \begin{cases} 0, & t_l = \text{true} \\ 1, & t_l = \text{false} \end{cases} \end{cases} \end{cases} \end{cases}$$

or in more detail $$\text{Equation 7}$$

$$\left( \left( c_2^{t_1^{l+1}} \simeq c_2^{t_2^{l+1}} \right) > 1 \right) \rightarrow$$

$$\psi(t_{l+1} = \text{false})\tau \begin{pmatrix} \left( c_1^{t_1^{l+1}} \simeq c_1^{t_2^{l+1}} \right) > 1 \begin{cases} 1, \vee\left(c_3^{t_1^{l+1}}, c_3^{t_2^{l+1}}\right) \begin{cases} \cdots \end{cases} \\ \text{for } t_{l+1} \begin{cases} c_2^k > c_2^n, c_1^k = Q^{\max}(c_3^k) \text{ AND } c_1^n = Q^{\min}(c_3^n) \\ c_2^k < c_2^n, c_1^k = Q^{\min}(c_3^k) \text{ AND } c_1^n = Q^{\max}(c_3^n) \\ c_2^k = c_2^n, c_1^k = Q^{\min}(c_3^k) \text{ AND } c_1^n = Q^{\min}(c_3^n) \end{cases}, \left( c_1^{t_1^{l+1}} \simeq c_1^{t_2^{l+1}} \right) > 1 \begin{cases} 0, t_{l+1} = \text{true} \\ 1, t_{l+1} = \text{false} \end{cases} \end{cases} \end{pmatrix}$$

Equation 7 is also shown in FIG. 7.

In summary, for all active associations (i.e all current interactions with other components) of the source component 112 of the proposed new association ($c_3^{t_1^{l+1}}$) and all active associations of the destination component 114 of the proposed new association ($c_3^{t_2^{l+1}}$), it is first necessary to determine whether the status value of source component 112 of the proposed new association ($c_1^{t_1^{l+1}}$) is lower than the status value of destination component 114 of the proposed new association ($c_1^{t_2^{l+1}}$) or vice-versa. It is important to note that there is no equal status value option as a difference between the security levels of the source and destination components 112, 114 has already been determined. Next, it is determined whether the proposed new association is a member of the set of active associations belonging to the source component 112 ($t_1 \in c_3^{t_1^{l+1}}$) or destination component ($t_1 \in c_3^{t_2^{l+1}}$). Then, it must be assessed whether the difference in security level of the components 110 and 114 of the existing association ($t_1$) would cause a status block. For example, if $t_1 \in c_3^{t_1^{l+1}}$ and $c_1^{t_1^{l+1}} > c_1^{t_2^{l+1}}$, then any $t_1$, where one of the components 110 has a security level greater than $c_2^{t_1^{l+1}}$ will give rise to a status block. If no status block exists, the existing association ($t_l$) may continue. If a status block exists, a priority assessment is made. If the existing interaction ($t_l$) has higher or equal priority than the newly requested association, then it may continue, otherwise the existing interaction must terminate and the newly requested interaction is allowed.

The four steps outlined above are combined into a single assessment that is carried out whenever a source component 110 requests activity with a destination component 114 resulting in a decision whether or not to allow the new association to be formed (i.e., ($t_{i+1}$=true)).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of controlling interactions between one or more components of a computer system, the system compromising a plurality of components configured to interact with each other to engage in activities, the method comprising:
assigning a fixed security level to each component of the system; and
monitoring all currently active and newly requested interactions between components of the system, a newly requested interaction comprising a request by a source component to interact with a destination component;
wherein:
if the difference between the security levels of the source and destination components exceeds one level, prohibiting the requested interaction;
if a source component is engaged in an interaction with any component with a lower assigned security level than its own and the requested interaction involves a destination component with a higher assigned security level, or that is currently engaged in an interaction with any component with a higher assigned security level, prohibiting the requested interaction;
if a source component is engaged in an interaction with any component with a higher assigned security level than its own, and the requested interaction involves a destination component with a lower assigned security level, or that is currently engaged in an interaction with any component with a lower assigned security level, prohibiting the requested interaction;
if a source component contains data having a higher security level than that assigned to the source component, and the requested interaction involves a destination component with a lower assigned security level, or that is currently engaged in an interaction with any component with a lower assigned security level, prohibiting the requested interaction;
if a source component contains data having a lower security level than that assigned to the source component, and the requested interaction involves a destination component with a higher assigned security level, or that is currently engaged in an interaction with any component with a higher assigned security level, prohibiting the requested interaction;
otherwise allowing the requested interaction.

2. The method of claim 1, wherein monitoring all currently active and newly requested interactions between components of the system comprises:
determining a status value for each of the source components and destination components of a requested interaction, the status value being determined in dependence of the assigned security levels of components currently engaged in interactions with the source and destination component of the requested interaction;
comparing the status values of the source and destination components of the requested interaction;
imposing a status block condition, when a difference of more than a single security level exists between the status values of the source and destination components of the requested interaction; and
prohibiting the requested interaction while a status block condition exists.

3. The method of claim 2, further comprising:
assigning a priority level to each activity that a component may engage in during an interaction;
when a status block condition has been imposed, isolating the existing interactions of the source and destination components that have given rise to the status block condition;
comparing the priority level associated with the activity involved in the isolated interactions with the priority level associated with the activity involved in the requested interaction between the source and destination components;
lifting the status block condition when the priority level of the activity of the isolated interaction is lower than that of activity of the requested interaction between the source and destination components and allowing the requested interaction;
otherwise maintaining the status block condition and prohibiting the requested interaction between the source and destination components.

4. The method of claim 2, wherein the step of determining a status value for the source component and the destination component of a requested interaction comprises:
comparing the security levels assigned to the source component and the destination component;
wherein:
if the assigned security level of the source component is lower than that of the destination component, assigning a status value to the source component that corresponds to the security level of the least secure component with which the source component is currently engaged in an interaction and assigning a status value to the destination component that corresponds to the security level of the most secure component with which the destination component is currently engaged in an interaction;
if the assigned security level of the source component is higher than that of the destination component, assigning a status value to the source component that corresponds to the security level of the most secure component with which the source component is currently engaged in an interaction, and assigning a status value to the destination component that corresponds to the security level of the least secure component with which the destination component is currently engaged in an interaction;
otherwise assigning a status value to the source component and the destination component that corresponds to the security level of the most secure component with which the respective source component and destination component is currently engaged in an interaction.

5. A security system of controlling interactions between one or more components of a computer system, the computer system including a plurality of components configured to interact with each other to engage in activities, the system comprising:

a security model enforcement mechanism (SMEM) configured to:
  assign a fixed security level to each component of the system; and
  monitor all currently active and newly requested interactions between components of the system, a newly requested interaction comprising a request by a source component to interact with a destination component;
  wherein:
    if the difference between the security levels of the source and destination components exceeds one level, the SMEM is configured to prohibit the requested interaction;
    if a source component is engaged in an interaction with any component with a lower assigned security level than its own and the requested interaction involves a destination component with a higher assigned security level, or that is currently engaged in an interaction with any component with a higher assigned security level, the SMEM is configured to prohibit the requested interaction;
    if a source component is engaged in an interaction with any component with a higher assigned security level than its own, and the requested interaction involves a destination component with a lower assigned security level, or that is currently engaged in an interaction with any component with a lower assigned security level, the SMEM is configured to prohibit the requested interaction;
    if a source component contains data having a higher security level than that assigned to the source component, and the requested interaction involves a destination component with a lower assigned security level, or that is currently engaged in an interaction with any component with a lower assigned security level, the SMEM is configured to prohibit the requested interaction;
    if a source component contains data having a lower security level than that assigned to the source component, and the requested interaction involves a destination component with a higher assigned security level, or that is currently engaged in an interaction with any component with a higher assigned security level, the SMEM is configured to prohibit the requested interaction;
    otherwise, the SMEM is configured to allow the requested interaction.

6. The system of claim 5, wherein the security model enforcement mechanism is embodied in an operating system of the computer system.

7. The system of claim 5, wherein the security model enforcement mechanism is implemented in a secure environment that cannot be accessed or circumvented by any components of the system.

8. A non-transitory, computer-readable medium storing program code instructions executable by a computer processor to perform a method, the method comprising:
  assigning a fixed security level to each component of the system; and
  monitoring all currently active and newly requested interactions between components of the system, a newly requested interaction comprising a request by a source component to interact with a destination component;
  wherein:
    if the difference between the security levels of the source and destination components exceeds one level, prohibiting the requested interaction;
    if a source component is engaged in an interaction with any component with a lower assigned security level than its own and the requested interaction involves a destination component with a higher assigned security level, or that is currently engaged in an interaction with any component with a higher assigned security level, prohibiting the requested interaction;
    if a source component is engaged in an interaction with any component with a higher assigned security level than its own, and the requested interaction involves a destination component with a lower assigned security level, or that is currently engaged in an interaction with any component with a lower assigned security level, prohibiting the requested interaction;
    if a source component contains data having a higher security level than that assigned to the source component, and the requested interaction involves a destination component with a lower assigned security level, or that is currently engaged in an interaction with any component with a lower assigned security level, prohibiting the request;
    if a source component contains data having a lower security level than that assigned to the source component, and the requested interaction involves a destination component with a higher assigned security level, or that is currently engaged in an interaction with any component with a higher assigned security level, prohibiting the request;
    otherwise allowing the requested interaction.

* * * * *